United States Patent Office 2,773,788
Patented Dec. 11, 1956

2,773,788

LAMINATE AND RESINOUS COMPOSITION

John K. Magrane and William S. Sloatman, Jr., Stamford, Conn., assignors to American Cyanamid Company, New York, N. Y., a corporation of Maine No Drawing. Application January 13, 1955,
Serial No. 481,702

10 Claims. (Cl. 154—43)

This invention relates to novel thermosetting resinous compositions. Further, this invention relates to novel thermosetting melamine-formaldehyde resinous compositions that find particular use in the production of laminated articles. This invention also relates to the novel resinous compositions, their methods of production and to articles produced therefrom.

Because of their excellent color, hardness, solvent and chemical resistance, aminoplastic resinous compositions, particularly melamine-formaldehyde resins, find many uses in the plastics, molding, coating and laminating fields. The aminoplastic resinous compositions give a thorough impregnation and thereby insure a complete bond when employed in the production of laminates and, at the same time, resistance to discoloration due to heat and light is also realized. However, these resins exhibit stiff flow at operating temperatures which is an obvious disadvantage in many respects. Various plasticizers and/or other modifiers have been incorporated into these resins in order to obtain improved plastic flow characteristics duringn the cure of the material. Other modifiers have also been employed to improve dimensional stability, workability and other properties of the aminoplastic resins. While certain of the physical properties of the aminoplastic resins, specifically melamine-formaldehyde resins, have been improved by incorporation of various modifiers into the composition, certain undesired features are nevertheless still present when the compositions are employed, as for example in the production of laminates. Thus, when a melamine-formaldehyde resin impregnated decorative overlay or print sheet is used in combination with a core assembly impregnated with a different thermosetting resinous composition, e. g. a phenol-formaldehyde composition, there is a tendency for the resin material of the core assembly to migrate into the print sheet which produces discoloration on exposure of the laminate to light. This phenomenon is known as bleeding. By using an increased resin content in the print or overlay sheet, the tendency of the core assembly to bleed is mitigated. Obviously, the use of an increased amount of resin in the print sheet is uneconomical. Other modifiers that have been employed in the prior art while giving enhanced physical properties to the cured material possess undesired characteristics during the preparation of the laminate. For example, certain modifiers when incorporated into the resinous syrup produce an unstable composition. Also, in certain instances the resinous composition, after impregnation and during drying, has a tendency to froth and thus drying of the impregnated paper must be carried out at an uneconomical rate in order to avoid this frothing. We have now found, in accordance with the present invention, by employing a novel two-component plasticizer or modifier for a melamine-formaldehyde resinous composition, that materials may be produced which overcome many of the disadvantages previously encountered in the prior art.

It is therefore an object of our invention to prepare novel melamine-formaldehyde resinous compositions. It is a further object of our invention to employ novel two-component plasticizers or modifiers in the preparation of a melamine-formaldehyde condensation product that finds particular application in the production of laminated articles. These and other objects of our invention will be discussed more fully hereinbelow.

As is well known, melamine-formaldehyde resinous compositions are prepared by the condensation reaction of melamine with formaldehyde. The resinous composition thus produced is heat-curable or potentially heat-curable and may be prepared in accordance with techniques well known to the art. The molar ratio of formaldehyde to melamine employed in the preparation of the condensation product may be within the order of from about 1:1 to about 6:1, respectively, but it is preferred preferred that the molar ratio be within the order of from about 1.5:1 to about 4:1, respectively. The condensation products obtained are water-soluble, e. g. water-dispersible, so that solutions or syrups thereof may be obtained.

The modifier employed in accordance with the present invention is a two-component system. One component of the modifier system is an α-alkyl-D-glucoside. The alkyl group in the glucoside may contain from one to four carbon atoms. Thus, such compounds as α-methyl-D-glucoside, α-ethyl-D-glucoside, α-butyl-D-glucoside and the like find employment in the present invention. Prior to the present invention various sugars, such as sucrose, lactose, glucose and the like, have been incorporated into the aminoplastic resins to modify the compositions. However, due to the many possible isomeric and tautomeric forms of these sugars, a composition possessing uniform properties could not be obtained in each instance. By the employment of the α-alkyl-D-glucosides, as herein set forth, wherein the lactol ring is definitely fixed, uniformly improved properties are insured in the modified composition. Not only is the modifier utilized in this invention relatively inexpensive, it is also water white and when incorporated into the resinous composition yields a composition that is also water white and has excellent color stability. It has been previously suggested that α-alkyl-D-glucosides be incorporated into alkylated aminoplastic resins for certain purposes. In the present case the aminoplastic resins, specifically melamine-formaldehyde resins, which are herein modified are substantially non-alkylated. As is well known, alkylated melamine-formaldehyde resins are obtained by reacting the melamine-formaldehyde condensation product in the presence of a compound containing an alcoholic hydroxy group whereby the methylol derivative of the condensation product reacts with the alcoholic hydroxy group of the modifier. The alklyated and non-alkylated melamine-formaldehyde condensation products are physically and chemically distinct. As previously stated, the melamine-formaldehyde resinous compositions herein modified are substantially non-alkylated. Any alkylation that is present is incidental and occurs only as a result of the solvent used, if present, during the formation of the condensation product such as, for example, small amounts of methanol which may be present in the aqueous formaldehyde solution.

The second component of the plasticizer employed in the preparation of the novel compositions of the present invention is a compound containing the methylol derivative of the group

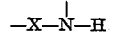

wherein X is one of the group consisting of $SO_2$ and CO. A more general formula for this group of compounds is the following

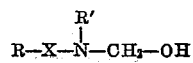

wherein R represents an organic radical, e. g. alkyl, aryl or aralkyl and R' represents hydrogen, alkyl, alkylol, aryl or an acyl group. Among the substances which contain the methylol derivative of the group

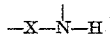

are N-methylol carboxylic acid amides, N-methylol sulfonamides, N-methylol imides and the like. These compounds may be produced in a suitable manner, such as by the reaction of a sulfonyl or carbonyl chloride with a methylol amine, by the reaction of a carboxylic acid amide with formaldehyde, by the reaction of an imide with an aldehyde, etc. Examples of compounds that may be employed as one component of the modifier in the present invention are such as N-methylol-toluene sulfonamide, N-methylol benzamide, N-methylol phthalimide, N-methylol toluamide, N-methylol stearamide, N-methylol succinimide, N-methylol-p-cymene sulfonamide, N-methylol tetralin sulfonamide, N-methylol xylene sulfonamide and the like. When one of the components of the modifier is, for example, toluene sulfonamide, it is preferred that the modifier consist of the ortho and para isomers thereof in the ratio of 40:60, respectively. Disubstituted compounds such as N,N'-dimethylol toluene disulfonamide and N,N'-dimethylol diphenyl disulfonamide may also be used. Also, the dimethylol derivatives of the various amides, imides and sulfonamides may be utilized herein. Plasticizers as herein defined have been previously suggested for incorporation in melamine-formaldehyde resins. For example, see the Schroy U. S. Patent No. 2,326,728 which issued August 10, 1943. The resinous compositions prepared in accordance with the above-identified patent while solving a particular problem nevertheless present certain disadvantages when employed in the production of laminated articles. It was found necessary to incorporate large amounts of alcohol into the solvent in order to obtain a soluble or dispersible syrup or varnish that could be employed for impregnation of the laminating sheets. It was also found that the resinous syrups or varnishes thus produced had limited stability. Also, when it was desired to dry impregnated laminating sheets at elevated temperatures and at a high rate of speed, as for example those employed when utilizing modern impregnation means, the treated laminate had a tendency to flake, frost, blister and the like. Consequently, resin impregnated laminating sheets that were difficult to handle were obtained. By employing the novel two-component modifying system as herein set forth and described, the disadvantages previously experienced are reduced. Also, the amount of alcohol necessary in the solvent in order to obtain a solution or dispersion of the resinous composition is greatly reduced which aids in eliminating the frothing problem and also reduces fire hazards which always accompany solvents containing a large amount of alcohol. Laminating sheets may be impregnated at high speeds and the sheets thus impregnated will be thoroughly wet throughout. In addition to these factors, it has been found that the bleeding of the resinous composition of the core assembly is overcome.

The amount of the modifier incorporated into the melamine-formaldehyde condensation in accordance with this invention may be within the order of from about 1% to about 35% by weight based on the total weight. It is preferred, however, that the amount of the modifier employed be within the order of from about 10% to about 30% by weight based on the total weight. The weight ratio of the two components of the modifier system herein employed may be within the order of from about 25:75 to about 75:25, respectively. Thus, for certain applications it may be desired to use a greater amount of an α-alkyl-D-glucoside, whereas in other applications it may be desired to employ a greater amount of the compound containing the methylol derivative of the group

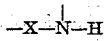

wherein X is as previously defined. For optimum results however, it is preferred that the weight ratio of the components of the modifiers herein used be within the order or from about 40:60 to about 60:40, respectively.

The component of the modifier system containing the methylol derivative of the group

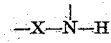

may be formed in situ during the condensation reaction of the melamine with the formaldehyde or, alternatively, the methylol derivative of the compound may be separately formed and then introduced into the melamine-formaldehyde condensation product. In any event, it is necessary that the plasticizer component containing the methylol derivative be introduced into the melamine-formaldehyde condensation product while the condensation product is in a liquid state. This is necessary inasmuch as it appears that the melamine-formaldehyde condensation product reacts with the compound containing the methylol derivative. When the methylol derivative of the component of the plasticizer is formed in situ during the condensation reaction of the melamine with the formaldehyde, it is necessary that an excess molar proportion of the formaldehyde be present equal to the molar proportion of the compound that forms the methylol derivative. If desired, the α-alkyl-D-glucoside may also be introduced into the resinous composition during the condensation reaction. Alternatively, the condensation product may be dried by conventional methods, e. g. pan dried, spray dried, etc., and the α-alkyl-D-glucoside then incorporated into the dry resinous material at any time prior to the cure of the composition.

In order that those skilled in the art may more fully understand the inventive concept herein produced, the following examples are given by way of illustration and not limitation unless otherwise noted in the appended claims. All parts are parts by weight.

*Example 1*

A. 126 parts of melamine, 162 parts of 37% formaldehyde and 25.5 parts of α-methyl-D-glucoside are charged to a stainless steel reactor equipped with an agitator and reflux condenser. The pH of the slurry is adjusted to about from 7.8 to 8.2. The slurry is then heated to reflux temperature in 30 minutes and held at reflux temperature for 20 minutes. The pH is adjusted to about 10 and the resulting clear solution is spray dried by conventional methods to yield a finely-divided soluble powder.

B. 126 parts of melamine, 203 parts of 37% formaldehyde and 38.3 parts of toluene sulfonamide (40/60 ortho, para ratio) are charged to a stainless steel reactor equipped with an agitator and reflux condenser. The pH of the slurry is adjusted to about from 7.4 to 7.8. The slurry is then brought to 80° C. in 30 minutes and maintained at this temperature for one hour. The pH is then adjusted to about 9.5 and cooled. The clear solution is spray dried by conventional methods to yield a finely-divided white powder. This powder is then blended in equal parts with that obtained in (A) above.

*Example 2*

126 parts of melamine, 183 parts of 37% methanol stabilized formaldehyde, 17.2 parts of toluene sulfonamide (40/60 ortho, para ratio) and 18.4 parts of α-methyl-D-glucoside are charged to a stainless steel reactor equipped with an agitator and reflux condenser. The pH of the slurry is adjusted to about from 7.8 to 8.0 and the slurry is heated to reflux in 30 minutes. The clear solution is cooled to 80°–85° C. and maintained at this temperature for three hours. At this time the pH is raised to about 10, the clear solution is cooled and the resulting product spray dried by conventional means to yield a finely-divided white powder.

Example 3

Following the procedure outlined in Example 2, a clair syrup of pH about 10 is prepared. During the cooling period 57 parts of water and 57 parts of denatured ethyl alcohol are added. The resulting clear solution can be used directly for impregnation of paper.

Example 4

A. 126 parts of melamine and 162 parts of 37% formaldehyde are charged to a stainless steel reactor equipped with an agitator and reflux condenser. The pH of the slurry is adjusted to about from 6.9 to 7.2. The slurry is then heated to reflux temperature in 30 minutes and held at reflux temperature for 20 minutes. The pH is then adjusted to about 10 and the resulting clear solution is spray dried by conventional methods.

B. 171 parts of toluene sulfonamide and 81 parts of 37% formaldehyde, which has previously been adjusted to a pH of from 6.8 to 7.2, are mixed and maintained at a temperature of between 20° C. and 30° C. for about 12 hours. The desired reaction is then substantially complete. The product, N-methylol toluene sulfonamide, is a clear oily liquid. The reaction may be carried out in a suitable solution, e. g. an alcoholic solution.

C. A laminating syrup is prepared by mixing 186 parts of spray dried melamine resin (Part A), 15 parts of α-methyl-D-glucoside, 15 parts of N-methylol toluene sulfonamide solids (Part B), 194 parts of water and 22 parts of isopropyl alcohol. The mixture is heated for one hour at 50°–60° C. and cooled. The resulting clear syrup may be used directly as a laminating syrup or it may be spray dried by conventional means to yield a finely-divided white powder.

Example 5

Commercial kraft paper is impregnated with a conventional phenol-formaldehyde core stock resin to a resin content of 30% and dried to a volatile content of 4.5%. A multicolor printed alpha-cellulose decorative paper of 100 pounds basis weight is impregnated with a laminating syrup, as described in Example 3 above, to a resin content of 42% and dried to a volatile content of 5%. Similarly, an alpha-cellulose overlay sheet of 28 pounds basis weight is impregnated with this same melamine resin syrup to a resin content of 68% and dried to a volatile content of 4.5%. An assembly is prepared consisting of multiple layers (5–10 sheets) of the phenolic impregnated kraft paper surfaced with a single sheet of the impregnated decorative paper overlayed with a single sheet of treated overlay paper. The assembly is pressed between polished chrome plated steel plates for 15 minutes at 290° F. and 1200 p. s. i. pressure, cooled and removed from the press. The now fully cured laminate reveals the decorative sheet clearly through the transparentized overlay sheet and it possesses a hard, glossy, wear-resistant surface which is impervious to most chemical agents.

In the production of laminates, laminating sheets are saturated with a solution or syrup of the resinous material. In view of the novel properties of the resinous compositions, only a minor amount of alcohol need be present in order to obtain a solution or dispersion of the composition. Thus, the solvent employed may contain 80 parts of water and only 20 parts of a water-soluble alcohol. It is preferred, however, that the solvent utilized contain as much as 95 parts of water and consequently only 5 parts of a water-soluble alcohol. The water-soluble alcohols utilized are the lower alkyl saturated monohydric alcohols, such as methyl alcohol, ethyl alcohol, isopropyl alcohol, tertiary-butyl alcohol and the like. The dispersion or syrup of the melamine-formaldehyde condensation product generally contains from about 45% to about 55% resin solids. In some applications, however, it may be desirable to reduce the resin solids content to as low as about 20% and for other applications to as high as about 60%. The amount of the modified resinous composition employed in the production of the laminates may vary from about 30% to about 80% by weight based on the total weight of the laminate. It is apparent that the amount of the resin present in the laminate will vary, depending upon the ultimate use of the product and also upon other considerations, as for example the type of laminating sheet being treated. After the laminating sheets are impregnated, they are dried at elevated temperatures to a desired volatile content. The sheets are then assembled in multiples between molding press platens and cured at elevated temperatures and pressures to form the laminated articles. In decorative laminates the overlay and the decorative print sheets are both impregnated with the modified resin. For economical reasons, the core assembly is usually impregnated with a different and cheaper thermosetting resin, as for example a phenol-formaldehyde condensation product. In industrial laminates wherein the sheets are usually of the same material, all of the sheets may be treated with the modified resin. Sheets of fibrous material, such as alpha-cellulose, paper, viscose rayon paper, glass cloth, or cloth formed of silk, cotton, wool, rayon or other synthetic fibers, may be utilized in the preparation of the laminated articles.

The laminating syrup of the present invention is preferably employed to impregnate alpha-cellulose or cellulosic saturating sheets which are employed in the production of decorative laminated articles. In this instance the cellulosic sheets are combined with a core assembly impregnated with a phenol-formaldehyde condensation product and then cured under heat and pressure to form the laminated article. A decorative overlay sheet having a thickness of about 2 to 5 mils is impregnated with from about 60% to about 75% by weight of the resinous syrup. On the other hand, the print sheet which may be pigmented has a thickness of about 6 to 12 mils and is impregnated with the resin to the extent of about 30% to about 55% by weight, preferably from about 35% to about 45% by weight. Impregnation of the cellulosic laminating sheets may be carried out by such methods as dipping, roll coating, spraying or the like. The resin impregnated sheets may be conveniently dried in a forced hot air oven or by infrared heating means to a volatile content less than about 6% by weight and, preferably, in the range of from about 3% to about 4% by weight. In certain instances it is desirable to lower the volatile content to as little as 0.5% by weight but in this instance extreme drying conditions are required. When the cellulosic sheets impregnated with the novel resinous composition of this invention are employed with a core assembly impregnated with a phenol-formaldehyde condensation product, the core assembly is usually impregnated in an amount of about 25% to 35%, preferably about 30% by weight and dried to a volatile content of less than about 6% by weight. After the cellulosic sheets are combined with a core assembly and cured at an elevated temperature and pressure to form the laminate, the laminate, if desired, may be buffed to produce a glossy effect thereon. When the laminate is cured between stainless steel platens, it is usually not necessary to buff the laminate in order to produce a glossy effect.

By the use of the novel resinous composition herein set forth and described, enhanced clarity in the overlay sheet is obtained. Laminates herein produced also exhibit improved dimensional stability.

It will be obvious that dyes, pigments and other colorants may also be incorporated into the resinous compositions to alter the visual appearance and the optical properties of the finished product. In certain instances it is desirable to incorporate curing agents, such as p-toluene sulfonic acid, phthalic anhydride, phthalic acid, benzoic acid and the like into the resinous compositions. Mold lubricants such as zinc stearate, calcium stearate, glycerol mono-sterate and the like may also be incorporated in the composition to facilitate the molding of the heat-curable compositions. The additives herein discussed may be mixed with the resinous composition at any point prior to the cure of the material by methods well known in the art.

While the present invention is concerned primarily with the modification of melamine-formaldehyde condensation products, it will be appreciated that the invention is applicable generally to amino-plastic resins which are, as is well known, synthetic resins derived from amino (including imino) or amido (including imido) compounds. The aminoplastics are products of reaction of ingredients comprising an aldehyde, e. g. formaldehyde, and a monomeric amidogen compound containing not less than 2 (e. g., 2, 3, 4 or any number, but preferably only 2 or 3) amidogen groupings each having at least one hydrogen atom, but preferably 2 hydrogen atoms, attached to the amidogen nitrogen atom. Compositions such as defined are melamine; urea; substituted melamines, e. g. methylmelamine; guanamines, e. g. acetoguanamines; and the like.

Accordingly, amidogen aldehyde aminoplastics which are heat-curable or potentially heat-curable resinous reaction products of ingredients comprising a polyaminotriazine, e. g. melamine and formaldehyde, or comprising urea-melamine or other polyaminotriazines and formaldehyde may be used in accordance with this invention. Further, heat-curable or potentially heat-curable urea-formaldehyde, thiourea-formaldehyde and thiourea- melamine-formaldehyde resinous reaction products may also be used. Dimethylol urea, alkyl ethers thereof, polymethylol melamines and alkyl ethers thereof may be employed. Examples of other amidogen compounds which may be reacted with an aldehyde to provide the primary product which is modified in accordance with the present invention are methylurea, phenylurea, allylurea, guanylurea, guanylthiourea, dicyandiamide, guanidine, biguanide, diaminodiazines, guanazole and other diamino-tirazoles, etc. These amidogen aldehyde aminoplastics in general are prepared in accordance with well known techniques. The molar ratio of aldehyde to amidogen compound, depending, for instance, upon the particular amidogen compound employed, may vary from about 0.333 to 1.0 mol thereof for each aldehyde-reactable amidogen grouping in the amidogen compound, preferably from about 0.4 to about 0.667 mol per mol, respectively. The amidogen aldehyde reaction products thus obtained are water-soluble or water-dispersible.

A suitable aldehyde may be utilized as a reactant with the amidogen compound in producing the aldehyde reaction product thereof. It is preferred to use formaldehyde, e. g. an aqueous solution thereof. Paraformaldehyde, hexamethylene tetramine or other compounds engendering formaldehyde may also be employed. Other aldehydes, such as for example paraldehyde, acetaldehyde, propionaldehyde, butyraldehyde, benzaldehyde, furfural, mixtures thereof or mixtures of formaldehyde with such other aldehydes or aldehyde, may be used. The properties desired in the final product and economic considerations are among the factors which will determine the choice of the aldehyde employed. It will be appreciated that, if aldehydes other than formaldehyde are employed in the preparation of the reaction product, the particular alkylol derivative of the compound containing the group

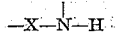

wherein X is as previously defined will be formed in the event that the compound per se is added during the condensation reaction of the aldehyde with the amidogen compound. However, the methylol derivatives of the compound are compatible with the aldehyde amidogen compounds and may be added thereto.

If desired, molding compositions may also be prepared utilizing the novel resinous composition of our invention. In the production of the molding composition various fillers may be introduced therein at any suitable stage of its manufacture. The fillers which may be used are such as alpha-cellulose, wood flour, walnut shell flour, calcined or natural asbestos in the form of a powder or short or long fibers, finely-divided silicon carbide, carbon black, graphite, diatomaceous earth, slate dust, ground cuttings (e. g., cuttings of silk, rayon, nylon or of cloth made from glass fibers), ground cork, etc. The proportions of fillers employed may be varied as desired or as conditions may require. Thus, for example, depending upon the particular filler employed and the intended use of the molded article, the filler may constitute from 5% to 80% by weight of the molded composition. Obviously, in certain applications no filler will be present.

We claim:

1. A thermosetting melamine-formaldehyde resinous composition comprising from about 1% to about 35% by weight based on the total weight of an α-alkyl-D-glucoside wherein the alkyl group contains from 1 to 4 carbon atoms and a compound containing the methylol derivative of the group

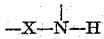

wherein X is one of the group consisting of SO₂ and CO and wherein the weight ratio of said glucoside to said compound containing the methylol derivative is from about 25:75 to about 75:25, respectively.

2. A thermosetting melamine-formaldehyde resinous composition comprising from about 10% to about 30% by weight based on the total weight of an α-alkyl-D-glucoside wherein the alkyl group contains from 1 to 4 carbon atoms and a compound containing the methylol derivative of the group

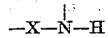

wherein X is one of the group consisting of SO₂ and CO and wherein the weight ratio of said glucoside to said compound containing the methylol derivative is from about 40:60 to about 60:40, respectively.

3. A thermosetting melamine-formaldehyde resinous composition comprising from about 1% to about 35% by weight based on the total weight of α-methyl-D-glucoside and a compound containing the methylol derivative of the group

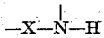

wherein X is one of the group consisting of SO₂ and CO and wherein the weight ratio of said glucoside to said compound containing the methylol derivative is from about 25:75 to about 75:25, respectively.

4. A thermosetting melamine-formaldehyde resinous composition comprising from about 10% to about 30% by weight based on the total weight of α-methyl-D-glucoside and a compound containing the methylol derivative of the group

wherein X is one of the group consisting of SO₂ and CO and wherein the weight ratio of said glucoside to said compound containing the methylol derivative is from about 40:60 to about 60:40, respectively.

5. A thermosetting melamine-formaldehyde resinous composition comprising from about 1% to about 35% by weight based on the total weight of an α-alkyl-D-glucoside wherein the alkyl group contains from 1 to 4 carbon atoms and the methylol derivative of toluene sulfonamide and wherein the weight ratio of said glucoside to said compound containing the methylol derivative is from about 25:75 to about 75:25, respectively.

6. A thermosetting melamine-fomaldehyde resinous composition comprising from about 10% to about 30% by weight based on the total weight of an α-alkyl-D- glucoside wherein the alkyl group contains from 1 to 4 carbon atoms and the methylol derivative of toluene sulfonamide and wherein the weight ratio of said glucoside to said compound containing the methylol derivative is from about 40:60 to about 60:40, respectively.

7. A thermosetting melamine-formaldehyde resinous composition comprising from about 1% to about 35% by weight based on the total weight of α-alkyl-D-glucoside and the methylol derivative of toluene sulfonamide and wherein the weight ratio of said glucoside to said methylol derivative is from about 25:75 to about 75:25, respectively.

8. A thermosetting melamine-formaldehyde resinous composition comprising from about 10% to about 30% by weight based on the total weight of α-methyl-D-glucoside and the methylol derivative of toluene sulfonamide and wherein the weight ratio of said glucoside to said methylol derivative is from about 40:60 to about 60:40, respectively.

9. A laminate comprising the heat and pressure consolidated structure of a core stock impregnated with 25%–35% by weight of a thermosetting resinous composition, a 6–12 mil print sheet impregnated with from about 35% to about 45% by weight of a melamine-formaldehyde resinous composition and a 2–5 mil overlay sheet impregnated with from about 60% to about 75% by weight of a melamine-formaldehyde resinous composition; wherein the melamine-formaldehyde resinous compositions contain from about 1% to about 35% by weight of a mixture of (1) a α-alkyl-D-glucoside, wherein the alkyl group thereof contains from about 1 to 4 carbon atoms and (2) the methylol derivative of a compound containing the group

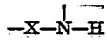

wherein X is a member selected from the group consisting of SO$_2$ and CO and wherein the weight ratio of said glucoside to said methylol derivative compound is from about 1:3 to about 3:1 respectively.

10. A laminate comprising the heat and pressure consolidated structure of a core stock impregnated with 25%–35% by weight of a thermosetting resinous composition, 6–12 mil print sheet impregnated with from about 35% to about 45% by weight of a melamine-formaldehyde resinous composition and a 2–5 mil overlay sheet impregnated with from about 60% to about 75% by weight of a melamine-formaldehyde resinous composition; wherein the melamine-formaldehyde resinous compositions contain from about 1% to about 35% by weight of a mixture of (1) a α-methyl-D-glucoside and (2) the methylol derivative of toluene sulfonamide, wherein the weight ratio of said glucoside to said sulfonamide is from about 1:3 to about 3:1 respectively.

References Cited in the file of this patent
UNITED STATES PATENTS

| | | |
|---|---|---|
| 2,355,245 | Schreiber et al. | Aug. 8, 1944 |
| 2,408,065 | Hansen | Sept. 24, 1946 |
| 2,525,310 | Novak | Oct. 10, 1950 |
| 2,545,716 | Thompson | Mar. 20, 1951 |
| 2,554,454 | Casebolt | May 22, 1951 |
| 2,616,861 | Jones | Nov. 4, 1952 |

OTHER REFERENCES

Noble, T. W.: "Plastics," pages 46–49 and 94–95, December 1946.